(No Model.)
O. F. PAEPKE.
CASTER.
No. 270,605. Patented Jan. 16, 1883.
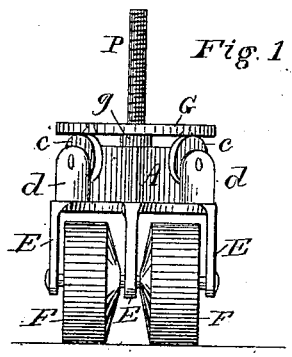
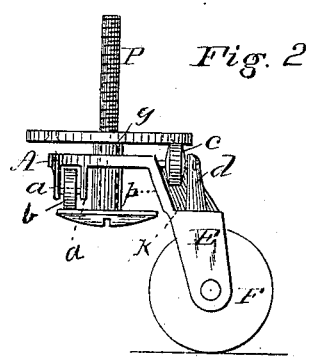
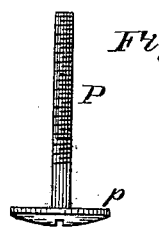
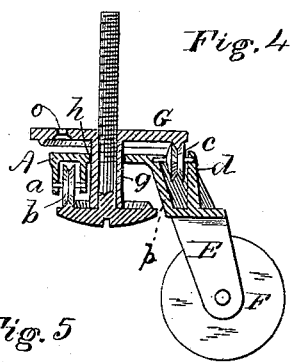
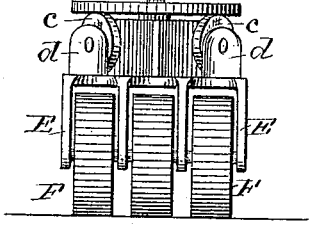
Witnesses:
Inventor
Oscar F. Paepke
By Talmadge Johnston
and
MacDonald
Attys.

UNITED STATES PATENT OFFICE.

OSCAR F. PAEPKE, OF INDIANAPOLIS, INDIANA.

CASTER.

SPECIFICATION forming part of Letters Patent No. 270,605, dated January 16, 1883.

Application filed June 5, 1882. (No model.)

*To all whom it may concern:*

Be it known that I, OSCAR F. PAEPKE, a citizen of the United States, residing at Indianapolis, in the county of Marion and State of Indiana, have invented certain new and useful Improvements in Casters for Light and Heavy Articles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to casters that can be used with platform weighing-scales, safes, and other heavy articles, or with lighter articles—such as furniture, &c.—and has for its object perfect facility of movement, with steadiness when at rest; and to this end it consists in certain details of construction and arrangement of the various parts, as will be hereinafter more fully set forth in the specification and claims, and pointed out in the accompanying drawings, in which—

Figure 1 is a front elevation; Fig. 2, a side elevation; Fig. 3, a detail view of the caster-bolt; Fig. 4, a section of the caster; and Fig. 5, a front elevation of same, showing three caster-wheels.

Referring more particularly to the drawings, A represents the lower caster-plate, having an opening, $h$, for the reception of collar $g$ of the upper caster-plate, G. The lower plate, A, is provided with ears or projections $a$ at its rear side, which are cast in one piece with the plate and form seats for friction rollers or wheels $b$. At the front end the plate A has ears $d$, by means of which the wheels $c$ are secured to the plate, and is also provided with the downwardly-projecting flanges E, in which the wheels or rollers F are journaled. The wheels $c$ are made large enough to allow free movement upon their axes, and are preferably of the same size on the same caster, and always work freely between the ears $d$ and under the platform G. This plate G is circular, and provided with a tubular collar or extension, $g$, which passes downward through the opening $h$ of plate A and receives the shank of the caster-bolt P, on the plate of which moves the wheel $b$. The platform G moves on friction-rollers $c$, while the plate A, with friction-roller $b$, travels on the head or plate of bolt P. This plate may have a flange, forming a track for the wheel $b$, as shown in Fig. 4. The platform G has three or more holes, $o$, for the insertion of screws to secure the platform to the scales, safe, or other article.

The operation of the device is evident from the drawings, and it is also evident that the weight is entirely upon the anti-friction wheels, and the several parts of the caster are firmly bound together by the screw-bolt P.

This form of construction of caster enables the article to be easily moved in any direction, and when at rest the article upon which it is attached will remain perfectly steady.

Having thus described my invention, what I claim is—

1. In a caster substantially as described, the plate A, having an opening for the reception of the tubular collar of the main platform and ears $a$ $d$ E for the reception of anti-friction wheels, and the roller-wheels, substantially as and for the purpose set forth.

2. In a caster, the caster-bolt P, passing through the plates A G, and provided with an enlarged head to form a way or track for a vertical anti-friction wheel, substantially as shown, and for the purpose set forth.

In testimony whereof I affix my signature in presence of two witnesses.

OSCAR F. PAEPKE.

Witnesses:
 HUGO M. HUG,
 R. F. PARKINGTON.